(12) United States Patent
Angle, II et al.

(10) Patent No.: US 7,708,229 B1
(45) Date of Patent: May 4, 2010

(54) CIRCULATION CONTROLLED AIRFOIL

(75) Inventors: Gerald M. Angle, II, Morgantown, WV (US); James E. Smith, Bruceton Mills, WV (US)

(73) Assignee: West Virginia University, Morgantown, WV (US)

( * ) Notice: Subject to any disclaimer, the term of this patent is extended or adjusted under 35 U.S.C. 154(b) by 935 days.

(21) Appl. No.: 11/387,136

(22) Filed: Mar. 22, 2006

(51) Int. Cl.
 *B64C 23/02* (2006.01)
(52) U.S. Cl. .................. 244/206; 244/210; 416/90 A; 416/91
(58) Field of Classification Search ............. 244/210, 244/206, 207, 198; 416/90 R, 90 A, 91, 231 R; 415/914
See application file for complete search history.

(56) References Cited

U.S. PATENT DOCUMENTS

| | | | |
|---|---|---|---|
| 3,005,496 | A | 10/1961 | Nichols |
| 3,990,811 | A | 11/1976 | Danielson |
| 4,045,146 | A | 8/1977 | Crimi |
| 4,137,008 | A | 1/1979 | Grant et al. |
| 4,146,202 | A | 3/1979 | Pender |
| 4,200,252 | A | 4/1980 | Logan et al. |
| 4,507,050 | A | 3/1985 | Jeffery et al. |
| 4,626,171 | A | 12/1986 | Carter, Sr. et al. |
| 4,798,515 | A * | 1/1989 | Hsia et al. ............ 415/115 |
| 4,966,525 | A | 10/1990 | Nielsen |
| 4,966,526 | A | 10/1990 | Amelio et al. |
| 5,054,721 | A | 10/1991 | Brenholt |
| 5,791,601 | A | 8/1998 | Dancila et al. |
| 6,142,425 | A | 11/2000 | Armanios et al. |
| 6,231,004 | B1 | 5/2001 | Peebles |
| 6,334,753 | B1 | 1/2002 | Tillman et al. |
| 6,425,553 | B1 | 7/2002 | Smith et al. |
| 6,755,374 | B1 | 6/2004 | Carson |

OTHER PUBLICATIONS

A. Seifert, T. Bachar, D. Koss, M. Shepshelovich, and I. Wygnanski, *Oscillatory Blowing: A Tool to Delay Boundary-Layer Separation*, American Institute of Aeronautics and Astronautics Journal (AIAA Journal), vol. 31, No. 11, Nov. 1993.
D. Greenblatt and I. Wygnanski, *Dynamic Stall Control by Periodic Excitation, Part 1: NACA 0015 Parametric Study*, American Institute of Aeronautics and Astronautics (AIAA) Journal of Aircraft, vol. 38, No. 3, May-Jun. 2001.
D. Greenblatt and I. Wygnanski, *The Control of Flow Separation by Periodic Excitation*, Pergamon Press, Progress in Aerospace Sciences 36 (2000) 487-545.
S.M. Ruffin and D.N. Mavris, *Application of Dynamic Slot and Circulation Control Technologies to Rotors for Noise Reduction and Dynamic Stall Elimination*, at http://www.ae.gatech.edu/labs/artlab/artl/detail.html, available online Mar. 21, 2006.

* cited by examiner

*Primary Examiner*—Timothy D Collins
(74) *Attorney, Agent, or Firm*—Thompson Hine LLP (57) ABSTRACT

A system and method provides for the manipulation of the aerodynamic characteristics of airfoils and other aerostructures using blowing and/or suction. This system and method uses one or more internal cavities located within an airfoil. An internal cavity is coupled to the exterior surface of the airfoil via one or more slots. A rotary actuator is incorporated into a slot. When the rotary actuator is rotated into a first position, it forms a channel that allows fluid to pass between the internal cavity and the air surrounding the airfoil. When the rotary actuator rotates into a second position, it prevents fluid from passing through the channel between the internal cavity and the air surrounding the airfoil.

22 Claims, 6 Drawing Sheets

CIRCULATION CONTROLLED AIRFOIL

TECHNICAL FIELD

The present invention relates generally to systems, devices, and methods for manipulating and controlling the aerodynamic characteristics of airfoils and other aerostructures using circulation slots and control methodologies thereof.

BACKGROUND

Aerostructures or airfoils generally possess a streamlined surface constructed such that air or other fluids flowing over the surface produce a pressure differential between generally opposing faces of the airfoil. This pressure differential applied across the airfoil surface produces a force, commonly called lift. Lift may describe a force generated in any direction in any medium. However, for most airfoils lift is typically the sum of forces applied to the airfoil perpendicular to direction of external flow around the airfoil. A second aerodynamic parameter that is associated with lift is lift induced drag, which is in the same vector direction as the external flow around the aerostructure. These properties and others are generally applicable to airfoils and aerostructures moving through a wide range of different fluid media including air and water.

The lift and drag characteristics of an airfoil are typically a function of the physical geometry of the airfoil, the characteristics of the external flow including velocity and density, and the orientation of the airfoil to the external flow. For an airfoil with a fixed structure the lift and drag characteristics are determined by the angle of the airfoil, or pitch, which effectively controls the relative angle of attack of the airfoil. The angle of attack for an airfoil is defined as the angle between the wing chord and the direction of the relative wind. On a traditional airfoil, a number of devices can be used to alter the relative lift-drag characteristics of the airfoil by effectively modifying the physical structure of the airfoil, including hinged surfaces such as ailerons, flaps, and slats, as well as, physical changes to the airfoil itself in the form of wing warping or discrete perturbations. By modulating the pitch and the physical characteristics of the airfoil or aerostructure, it is possible to modulate the lift and drag characteristics of the airfoil, and thus control the vehicle.

There are multiple ways to determine the lift of a particular airfoil or aerostructure. One method is through a mathematical construct called circulation. Circulation is effectively the line integral of the velocity of the air (or other fluid), in a closed loop around the boundary of an airfoil. Once an estimate of the circulation of air around an airfoil is known, then the sectional lift of the airfoil or other aerostructure in a particular section is calculated as the product of the fluid density, the freestream velocity, and the circulation. Although circulation is not the most intuitive method of understanding the actual mechanics of lift on an arbitrary airfoil, it provides a useful construct for understanding how changes in the flow field around an airfoil can be manifest as significant changes in the aerodynamic performance of the airfoil.

A circulation controlled airfoil or aerostructure may utilize a number of different techniques to modify the circulation of air around the airfoil directly, thus modulating the effective lift of the airfoil. One exemplary method of circulation control is the use of blowing or suction slots strategically placed on an airfoil. The controlled injection or removal of fluid, e.g., air, into and from the flow field around the airfoil produces a change in the circulation which in turn is used to manipulate the aerodynamic coefficients of the airfoil without the need to either physically alter the airfoil nor adjust the airfoil pitch.

Airfoils or aerostructures are used in a variety of applications. For example, on high speed automobiles it is common to use adjustable airfoils which, when coupled with the body itself, produces a lifting force to press the vehicle towards the ground in order to improve traction. Watercraft and submarines also use control of the lift-drag characteristics of airfoils to the control the vehicle as it passes through the water. Perhaps one of the most recognizable applications of airfoils and aerostructure control is in aircraft and gliders, where the wings, empennage, and even the body, engine nacelles, and nose are commonly manipulated using a variety of techniques including hinged control surfaces and physical modification of the structures in order to obtain controlled flight of the air vehicle.

A well-known application for airfoils is on helicopters or rotorcraft. A helicopter is a vehicle which uses rotating airfoils, commonly called blades or rotor blades, to generate a significant portion of the lift necessary for the vehicle to stay in flight. On many helicopters today, the pitch of the rotor blades is controlled in order to modulate the effective lift generated, using a complex mechanical system that enables the blades to be collectively manipulated as a group and for each individual blade to be manipulated usually as a function of rotational position. Helicopters need this control because as the rotating blades travel around the helicopter, the relative air velocity over the surface of the blades increases and decreases continuously based on whether the blades are heading into the flight path of the helicopter or away. Since the air velocity directly influences the lift generated by an airfoil, it is necessary to modulate the lift generated as a function of rotor position in order to maintain relatively constant lift throughout the rotation of the rotor blade and to minimize asymmetric forces applied to the rotor hub itself, thereby reducing overall stress in the assembly. Traditionally, blade lift properties have been controlled using a swash plate that a portion of the blades ride along to rotate their effective pitch as they rotate about the hub. The use of mechanical controls to change the pitch of an entire blade as it rotates about the hub is difficult to maintain and can result in large complex structures. The manipulation of a blade at the hub using mechanical means, like a swash plate, also induces significant stresses in the blade structure. Therefore, there is a need for a rotor blade having an alternative means for controlling the effective lift generated by the airfoil without the need to physically adjust the pitch of the entire blade. Several types of helicopters also use other lifting structures to generate additional lift, however the basic operation, principals, and challenges associated with the operation of the rotor blades remains essentially the same.

In addition to control of the main rotor blades, a helicopter also needs to control the reaction torque generated by the rotation of the rotor blades. In most helicopters, this is controlled via a small rotor system attached to the tail oriented such that the lift generated by the tail rotor counteracts the reaction torque caused by driving the main rotor. The lift generated by this rotor system is modulated by either changing the rotational velocity of the tail rotor or changing the pitch of individual blades. Other systems include the use of reaction jets and ducted fans. Other alternative approaches have attempted to control the lift generated by the tail boom of the helicopter generated by the downwash of air from the rotor blades over the tail boom aerostructure. Still other designs have incorporated a twin, counter-rotating main rotor to eliminate the torque.

These exemplary systems demonstrate only a small number of the variety of ways in which the ability to directly manipulate the effective lift generated by an airfoil or aerostructure traveling through a variety of fluid media, including air and water, can be used. Therefore, there is a need for a system and method of manipulating and controlling the aerodynamic characteristics of an airfoil or aerostructure. There is also a need for a system and method of manipulating and controlling the aerodynamic characteristics of an air vehicle control with either no or with significantly limited requirements for hinged control surfaces. Specifically, a system and method are needed to control the lift characteristics of an airfoil or helicopter rotor blade enabling either a reduction in the amount of motion or pitching required from the swash plate and the blade hinge system or to allow the complete elimination of the swash plate and blade hinges altogether. In the case of rotorcraft, directly manipulating and controlling aerodynamic coefficients can minimize the forces imposed on traditional rotor systems and enable the creation of hingeless rotors.

BRIEF DESCRIPTION OF THE DRAWINGS

The accompanying figures depict multiple embodiments of the circulation controlled airfoil or aerostructure and associated control methodologies. A brief description of each figure is provided below. Elements with the same reference numbers in each figure indicate identical or functionally similar elements. Additionally, as a convenience, the left-most digit(s) of a reference number identifies the drawings in which the reference number first appears.

DETAILED DESCRIPTION

Figure 1:
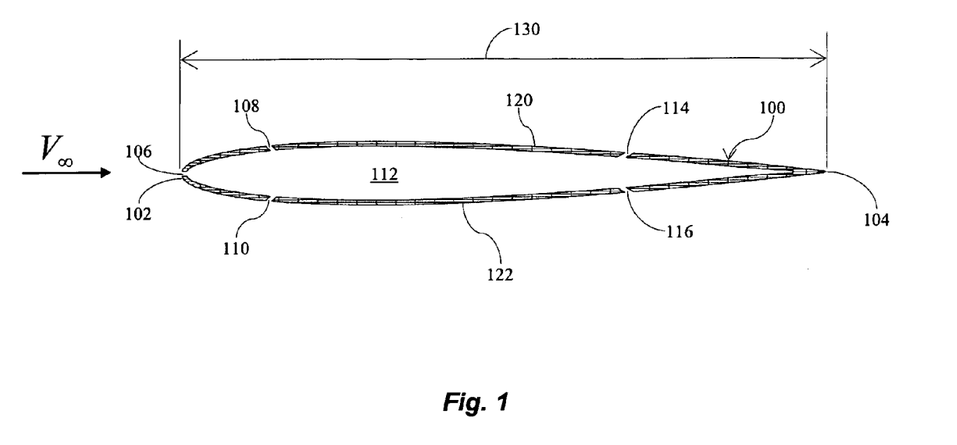
FIG. 1 is a cross-sectional view of one airfoil embodiment.

A first embodiment of an airfoil 100 of the present invention is shown in FIG. 1. This embodiment shows a cross sectional view of a rotor blade, more generally an aerostructure or airfoil 100. The airfoil 100 has a leading edge 102 that is generally oriented toward the relative vector of the free stream velocity, $V_\infty$, and a trailing edge 104 that is generally oriented away from the relative free stream velocity $V_\infty$. The airfoil 100 also has an internal cavity 112. In this particular embodiment, the internal cavity 112 is defined by the outer surface of the airfoil 100. However, in alternative embodiments, the internal cavity 112 can be defined by internal elements including bladders and other flexible surfaces or alternatively semi-rigid inserts, baffles, screens and active or non-active pressure control devices to maintain a desired pressure along the wingspan. In some embodiments for rotor wings, these internal elements control the pumping action caused by centrifugal forces within the medium along the length of the span.

Further, the internal cavity 112 may also be subdivided into multiple cavities which may be separated from each other and maintained at different pressures. The internal cavity 112 typically contains a pressurized fluid, but in some circumstances or methods of operation, the internal cavity 112 serves as a vacuum or low-pressure chamber. The preferred pressured fluid of the present invention is air; however, the present invention is equally applicable to using pressurized fluids.

The embodiment detailed in FIG. 1 of the airfoil 100 shows multiple slots. There is a leading edge slot 106 which is placed on the airfoil 100 in this embodiment near the leading edge 102. The leading edge slot 106 is in communication with the internal cavity 112 thereby enabling injection of fluid from the cavity 112 into the local flow field or alternatively ingestion of fluid out of the local flow field surrounding the airfoil 100. The airfoil 100 has additional slots located at different chord locations along the airfoil.

The chord 130 of the airfoil 100 is the distance from the two extreme points of the airfoil section, the leading edge 102 to the trailing edge 104. Measurements of the airfoil 100 section are relative to the chord 130 and expressed as ratios of the overall chord 130 length. To illustrate, a chord position of 0.3 or 30% on an airfoil with a length of 1 meter would be located at 0.3 meters from the leading edge 102 of the airfoil 100.

In the embodiment shown, the airfoil 100 has an upper slot 108 located on the airfoil's 100 upper surface 120 at specified chord 130 position of less than or equal to 0.5 (50%), resulting in the upper slot 108 being in the front portion of the airfoil 100. A lower slot 110 is also shown on the lower surface 122 also at a chord 130 position of less than or equal to 0.5 (50%), also resulting in the lower slot 110 being in the front portion of the airfoil 100. In this embodiment as shown, both the upper slot 108 and the lower slot 110 are at the same chord 130 position, which is approximately 20%. In the embodiment shown in FIG. 1, there is also a trailing upper slot 114 and trailing lower slot 116 which are placed at a greater chord position relative to the upper slot 108 and lower slot 110. In this embodiment, the trailing upper slot 114 and trailing lower slot 116 are placed at a chord 130 length of about 75%. One of ordinary skill in the part can select alternative chord 130 locations for the slots 108, 110, 114, and 116 based on the local flow conditions of the fluid over the surface of particular airfoil 100 geometry. In addition, although the present invention is described in terms of the five slots 106, 108, 110, 114, and 116, wherein two located on the upper surface 120 and two located on the lower surface 122, these are shown for convenience only. It is readily apparent to one of ordinary skill in the art to design an airfoil of the present invention using a different number of slots 106, 108, 110, 114, and 116, including different numbers of slots on the upper surface 120 and lower surface 122.

The slots 106, 108, 110, 114, and 116 shown in FIG. 1 maintain a constant chord 130 location over the entire span of the airfoil 100. In alternative embodiments, the slots 106, 108, 110, 114, and 116 are interrupted to form shorter slots at a common chord 130 location along short spans. In yet another embodiment, the chord location of the slots can vary based on the spanwise location of the individual slot so it does not necessarily parallel the leading edge 102 or trailed edge 104 of the airfoil 100. In one embodiment of the airfoil 100, the length of the slots 106, 108, 110, 114, and 116 is about 15-30% of the total spanwise length of the airfoil 100. In another embodiment, the length of the slots 108, 110, 114, and 116 is about equal to 80% of the total airfoil 100 spanwise length. In yet another embodiment, each of the slots on the airfoil has different lengths and can be separately controlled for pressure and flow intervals.

In the case of multiple slots located at different spanwise locations along the airfoil 100 length, in one embodiment, the slots 108, 110, 114, and 116 maintain a constant chord 130 position along the entire length of the airfoil 100. In an alternative embodiment of multiple slots spaced at different spanwise locations along the airfoil 100 length, the slots 108, 110, 114, and 116 are placed at varying chord 130 locations.

Rotary Actuator Slot Control Embodiment

Figure 2:
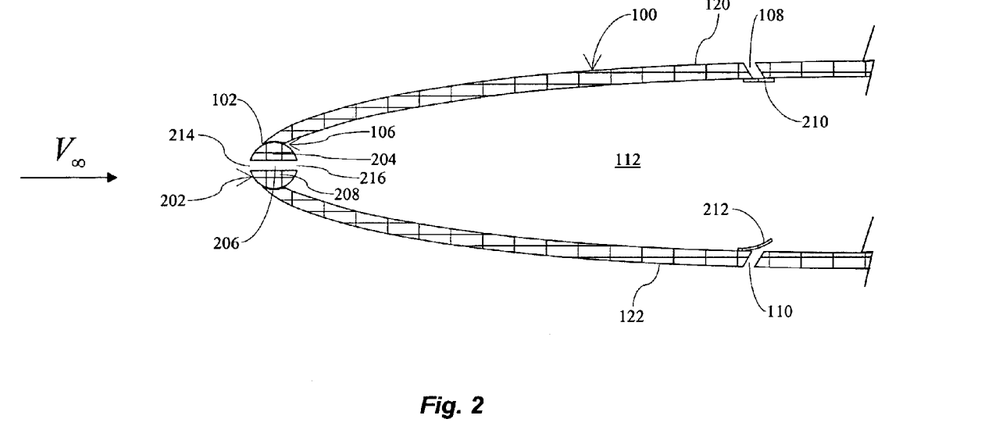
FIG. 2 is a cross-sectional view of the leading edge of another airfoil with a single slot rotary control embodiment.

FIG. 2 shows an embodiment of a circulation controlled airfoil 100 with a rotary actuator for a central blowing slot, such as slot 106. In the particular embodiment shown, the leading edge 102 has a rotating assembly 202 positioned in the leading edge slot 106. The rotating assembly 202 has a circular cross section sized to fit within the leading edge slot 106. The circumference of the rotating assembly 202 forms part of the airfoil 100 surface near the leading edge 102 with the upper surface 120 and the lower surface 122 in the area where the leading edge slot 106 is defined. The rotating assembly 202 has a first part 204 and a second part 208 which are positioned relative to each other to create a central channel 206 having an external opening 214 and an internal opening 216.

The rotating assembly 202 also has a diameter length substantially equal to or greater than the length of the leading edge slot 106, where it is housed. For embodiments where the leading edge slot 106 is broken into multiple distinct segments, then in one embodiment, the rotating assembly 202 forms one continuous element that spans the multiple segments of the leading edge slot 106. In an alternative embodiment, the rotating assembly 202 is broken into individual elements, each substantially equal to or greater than the length of the associated segment of the leading edge slot 106, and each of the individual rotating assembly 202 elements may be controlled individually or selectively linked together.

The rotating assembly 202 has a means for rotating about a central axis that causes the external opening 214 of the channel 206 to rotate toward either the upper surface 120 or the lower surface 122. The axis of rotation of the rotating assembly 202 is substantially aligned with the leading edge 102. The rotating assembly 202 effectively serves as the leading edge 102 of the airfoil 100. The rotation of the rotating assembly 202 changes the rotational angle of the channel 206, thereby effecting a pitch or angle change in the direction of flow into or out of the channel 206. The angle of the channel 206 is measured relative the chord line 130.

The airfoil 100 depicted in the embodiment shown in FIG. 2 also details an upper slot 108 and a lower slot 110. With each slot 108 and 110, there is an associated upper slot valve 210 and a lower slot valve 212 respectively. Each of the valves 210 and 212 regulates the flow of fluid from the cavity 112 to and from the local flow field surrounding the airfoil 100. Ejection or injection of fluid through the upper slot 108 and the lower slot 110 modulate the airfoil's 100 aerodynamic coefficients. The control provided by use of the upper slot 108 and the lower slot 110 can either control the airfoil 100 independently or, alternatively, operate in conjunction and effective cooperation with the rotating assembly 202 based leading edge slot 206. The upper slot valve 210 and lower slot valve 212 comprise a number of different devices. One embodiment of the control devices is a well-known piezoelectric controlled slot. Some examples of alternative mechanisms for controlling the flow of fluid through the slot 108, include rotary devices such as the rotary assembly 202 depicted at the leading edge 102, small flaps, louvers, and sliding windows among other techniques known to those of ordinary skill in the art.

The internal cavity 112 in one embodiment contains a pressurized fluid. A variety of different means may provide the pressurized fluid, including but not limited to, blowers or compressors, engine bleed air, or exhaust gas. The fluid pressure urges the fluid contained in the internal cavity 112 to be ejected through one or more slots which, in this embodiment, are shown as the leading edge slot 106 and the upper slot 108 and lower slot 110. The fluid ejected from the various slots 106, 108, and 110 changes the local flow field surrounding the airfoil 100 and thus provides a means for controlling the airfoil's 100 aerodynamic properties, including the effective lift, and induced drag produced by the airfoil 100. Although the embodiment depicted in FIG. 2 shows one leading edge slot 106 and a pair of upper and lower slots 108, 110, a number of alternative configurations are available. These alternative configurations include, but not limited to, configurations that contain only the leading edge slot 106 with a rotating assembly 202, whereby the rotation of the rotating assembly 202 orients the channel 206 between a first position and a second position, in an up/down cycle, thereby causing the airfoil 100 to first generate additional lift and then spoil lift in a cyclic pattern. In yet another embodiment, the internal cavity 112 is held at a lower pressure, or vacuum relative to the free stream air pressure surrounding the airfoil 100.

The rotating assembly 202 is rotatably secured within the leading edge slot 106 by conventional means, including, but not limited to, fasteners, brackets, bolts, and the like. The rotation of the rotating assembly 202 is controlled either electronically or mechanically. In the case of electronic control, software executing on one or more computer processors (not shown for convenience purposes) that is in communication with the rotating assembly 202 controls the operation of the electric, electro-hydraulic, solid state, or hydraulic actuators. For a mechanical system, the control linkage to the mechanical linkage of the rotating assembly 202 uses a conventional cable or pulley. In an alternative embodiment, coupling to another structure such as an aileron on a traditional aircraft or swash plate on a helicopter actuates the rotating assembly 202 in cooperation with the other structure. In another embodiment, piezoelectric actuators are used to rotate the rotating assembly 202.

In yet another alternative embodiment particularly suited for use on a rotor blade, the rotation of the rotating assembly 202 is controlled by another mechanical means. A conventional ratcheting system rotates the channel 206 such that when the airfoil 100 is moving forward in relation to the vehicle, the channel 206 is moved into a first position, i.e., the external opening 214 points up in order to increase lift from the airfoil 100. Then, when the rotor blade is moving backwards in relation to the vehicle, the channel 206 is automatically moved into a second position, i.e., the external opening 214 points down in order to decrease lift from the airfoil 100 when it is experiencing an area of reduced relative velocity.

Rotary Slot Control Embodiment with Sealing Mechanism

Figure 3:
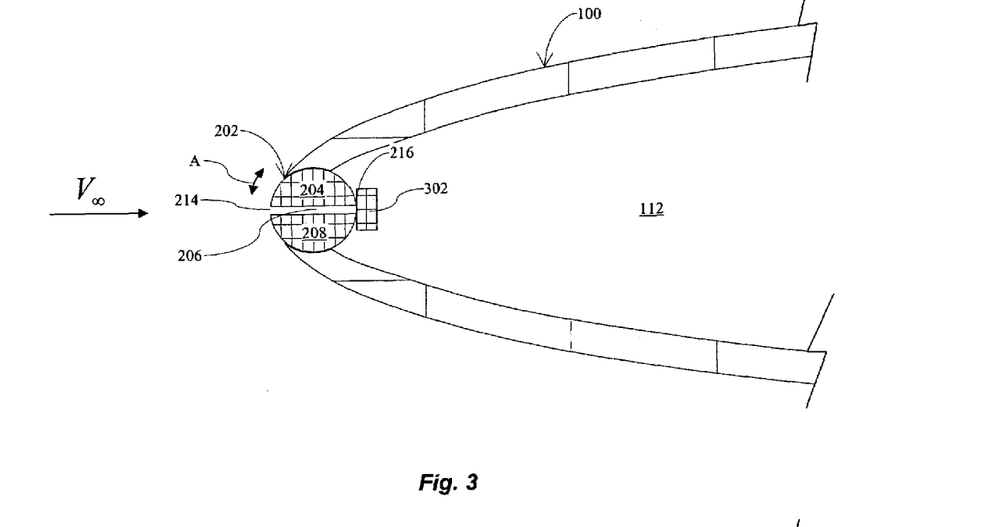
FIG. 3 is a cross-sectional view of the leading edge of another airfoil embodiment with another embodiment of a single slot rotary control mechanism.

Referring now to the embodiment depicted in FIG. 3, a rotary actuator with a rotating assembly 202 is shown with a rear sealing mechanism 302 in communication with the internal opening 216 of the central channel 206. The sealing mechanism 302 is a block which seals the internal opening 216 to the channel 206 from the internal cavity 112 when the rotating assembly 302 is in specific orientations. The sealing mechanism 302 in this embodiment is shown as a rectangular seal for simplicity. In alternative embodiments, the sealing mechanism 302 may take a number of different shapes that modulate the flow pattern emerging from the opening 216, including shapes that vary as the sealing mechanism 302 traverses the opening 216. In the embodiment shown, the sealing mechanism 302 closes the internal opening 216 of the channel 206 when the channel 206 is in the horizontal plane or near the zero degree angle. See FIG. 3. The sealing mechanism 302 is fixed by conventional mechanical means relative to the rotating assembly 302. When the rotating assembly 202 rotates in direction A as shown in position on FIG. 3 about a central axis, the internal opening 216 of the channel 206 moves from a closed position away from the sealing mechanism 302, progressively increasing the size of the internal opening 216 to the channel 206 until the rotation in direction A brings the central channel 206 to an open position no longer in contact with the sealing mechanism 302.

Multi-Inlet Rotating Assembly Embodiment

Figure 4:
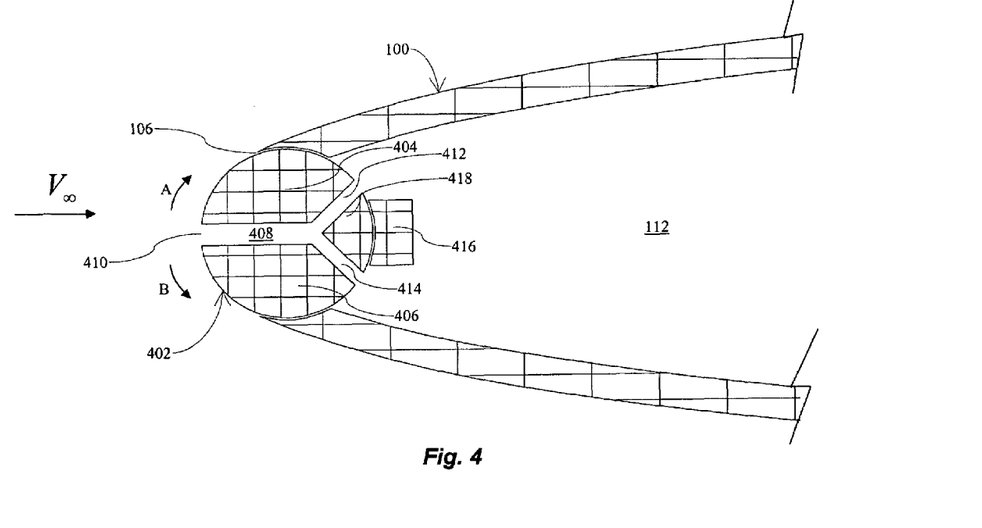
FIG. 4 is a cross-sectional view of the leading edge of another airfoil embodiment with yet another embodiment of a rotary control mechanism.

An alternative embodiment of a rotating actuator for addressing or associating slots on the airfoil 100 to an internal cavity 112 is depicted in FIG. 4. The alternative rotating assembly 402 is comprised of a first part 404 and a second part 406 with a wedge 418 that together define a channel 408. The channel 408 is Y-shaped, with an external opening 410 and a first internal opening 412 and a second internal opening 414. A sealing mechanism 416 shown with a seal shaped to fit the contour of the rotatable assembly 402 is also included in this embodiment such that as the channel 408 is rotated, the sealing mechanism 416 closes some of the two internal opening 412 or 414. In other words, as the rotating assembly 402 and channel 408 is rotated up in direction A, the first internal opening 412 becomes closed to the internal chamber 112 via sealing mechanism 416. Similarly, as the rotating assembly 402 and channel 408 is rotated down in direction B, the second internal opening 414 becomes closed to the internal chamber 112 via sealing mechanism 416.

The flow of fluid from the internal chamber 112 through the channel 408, as defined by the relationship between the internal openings 412 and 414 and the sealing block 416 in one embodiment, produces a specific flow pattern in the channel 408. This flow pattern further adjusts the fluid ejection angle from the channel 408 into the flow field surrounding the airfoil 100 and thereby modifies the effective aerodynamic properties of the airfoil 100. In yet another embodiment, the internal cavity 112 is subdivided into multiple fluid chambers that are held at different pressures. The rotation of the alternative rotating assembly 402 effectively modulates the amount of fluid either ingested or ejected from the external opening 410 by selectively addressing the internal openings 412 and 414 to the respective fluid chambers in the internal cavity 112.

In the embodiment depicted in FIG. 4, the sealing mechanism 416 is shown as a single block oriented near the zero degree position of the sealing mechanism 416. In an alternative embodiment, the sealing mechanism 416 is a series of multiple blocks. The multiple blocks are disposed at different locations around the alternative rotating assembly 402. When the alternative rotating assembly 402 rotates relative to the multiple blocks of the sealing mechanism 416, the internal openings 412 and 414 selectively address different potions of the internal cavity, or cavities 112. In this manner, a variety of different changes in the circulation pattern around the airfoil 100 are created by adjusting the rotation of the alternative rotating assembly 402.

Asymmetric Rotating Assembly

Figure 5:
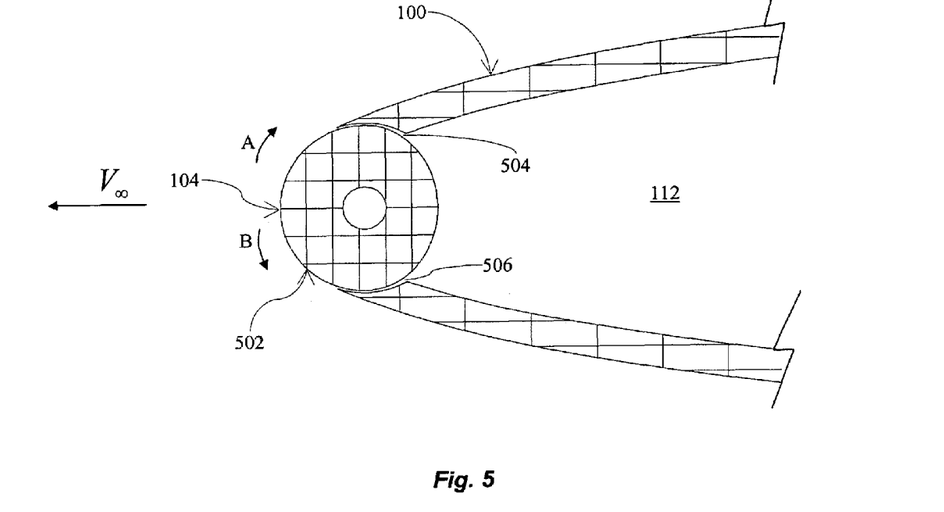
FIG. 5 is a cross-sectional view of a trailing edge of another airfoil embodiment with an embodiment of an asymmetric rotating control mechanism.

FIG. 5 shows an embodiment with a rotary actuator formed from an asymmetric rotating assembly 502. The asymmetric rotating assembly 502 in this embodiment has a substantially elliptical or oval shape. The asymmetric rotating assembly 502 is shown located in the trailing edge 104 of the airfoil 100. The rotating assembly 502 creates two channels in this embodiment, a first trailing edge slot 504, and a second trailing edge slot 506 when rotated relative to the structure of the airfoil 100. As the rotating assembly 502 rotates in an up direction A, the first leading edge slot 504 narrows until it closes. At the same time, the second leading edge slot 506 widens until it completely opens a channel thereby allowing the passage of fluid between the internal cavity 112 and the flow field around the airfoil 100. Likewise, as the rotating assembly 502 turns in the down direction B toward the second trailing edge slot 506, the second trailing edge slot 506 narrows until it ultimately closes while the second trailing edge slot 504 widens until it is completely open. By rotating the asymmetric rotating assembly 502, the size of the trailing edge slots 504 and 506 are modulated, thereby controlling the flow of fluid between the internal cavity 112 and the flow field. Further, the rotation of the asymmetric rotating assembly 502 enables a channel to be formed between the internal cavity 112 and the flow field, which alternates between the upper surface 120 and the lower surface 122 of the airfoil 100. The asymmetric rotating assembly 502 thus enables modulation of the aerodynamic characteristics of the airfoil 100.

In an alternative embodiment, not shown for convenience, the asymmetric rotating assembly 502 is located on the leading edge 102 of the airfoil 100. When positioned on the leading edge 102, as the asymmetric rotating assembly 502 is turned to the appropriate orientation relative to the structure of the airfoil 100, it creates a first leading edge slot 504 and a second leading edge slot. The first and second leading edge slots correspond to the respective first trailing edge slot 504 and second trailing edge slot 506 respectively shown in FIG. 5.

In yet another embodiment, also not shown for convenience, the asymmetric rotating assembly 502 is replaced by a fixed assembly. The first trailing edge slot 504 and second trailing edge slot 506 are still located near the edges of the now fixed assembly. The opening and closing of the first trailing edge slot 504 and the second trailing edge slot 506 are controlled instead by a series of piezoelectric actuators located along either the length of the first and second trailing edge slots 504 and 506 or alternatively along the surface of the airfoil 100. The piezoelectric actuators are placed such that actuation opens and/or closes the first trailing edge slot 504 and the second trailing edge slot 506.

Swiveling Control Assembly

Figure 6:
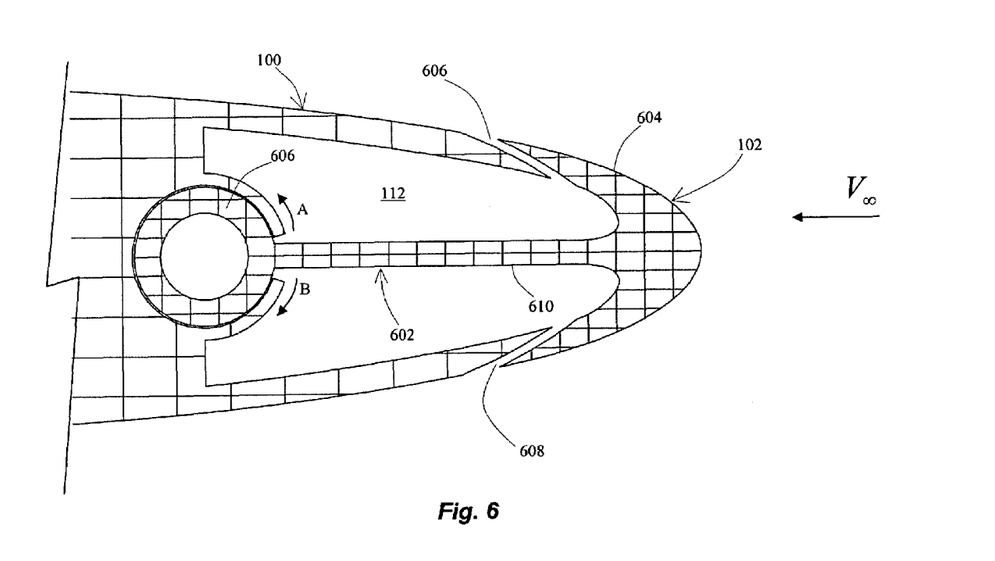
FIG. 6 is a cross-sectional view of the leading edge of another airfoil embodiment with an embodiment of a swiveling control assembly.

FIG. 6 shows still another embodiment of a rotary actuator based circulation control airfoil. This embodiment has a swiveling control assembly 602 adapted to create two channels, a first leading edge slot 606 and a second leading edge slot 608. In this embodiment, the swiveling control assembly 602 has a shaft 610 connecting a base 606 to a head 604, such that upon rotation of the base 606, the head 604 also rotates. The U-shaped head 604 is positioned as the leading edge 102. When the head 604 rotates, it creates a first leading edge slot 606 and a second leading edge slot 608. As the head 604 of the swiveling control assembly 602 moves downward in direction B, a channel is formed as the first leading edge slot 606 is opened while the channel in the second leading edge slot 608 closes. As the leading edge slot 606 is opened, a channel is formed between the internal cavity 112 and the flow field surrounding the airfoil 100. Alternatively, as the head 604 of the swiveling control assembly 602 moves upward in direction A, the channel 608 opens, while the channel 606 closes. As the swiveling control assembly 602 is swiveled up and down, the relative size of the channel and thus flow through the first and second leading edge slots 606, 608 is controlled thereby modulating the effect on the flow field surrounding the airfoil 100.

In an alternative mode of operation, a similar swiveling control assembly 602 replaces the rotating base 606 with a fixed base. A piezo-electro of other shape-change material actuator thus moves the swiveling control assembly 602 up or down in the leading edge 102. The bending of the shaft 610 thus displaces the head 604 in order to open and close the first and second leading edge slots 606 and 608 respectively. Some examples of different shape-change material actuators include electro-active polymers, magneto-strictive, bi-metallic, and shape-memory alloys.

Integrated Multi-Actuator Circulation Controlled Airfoil

Figure 7:
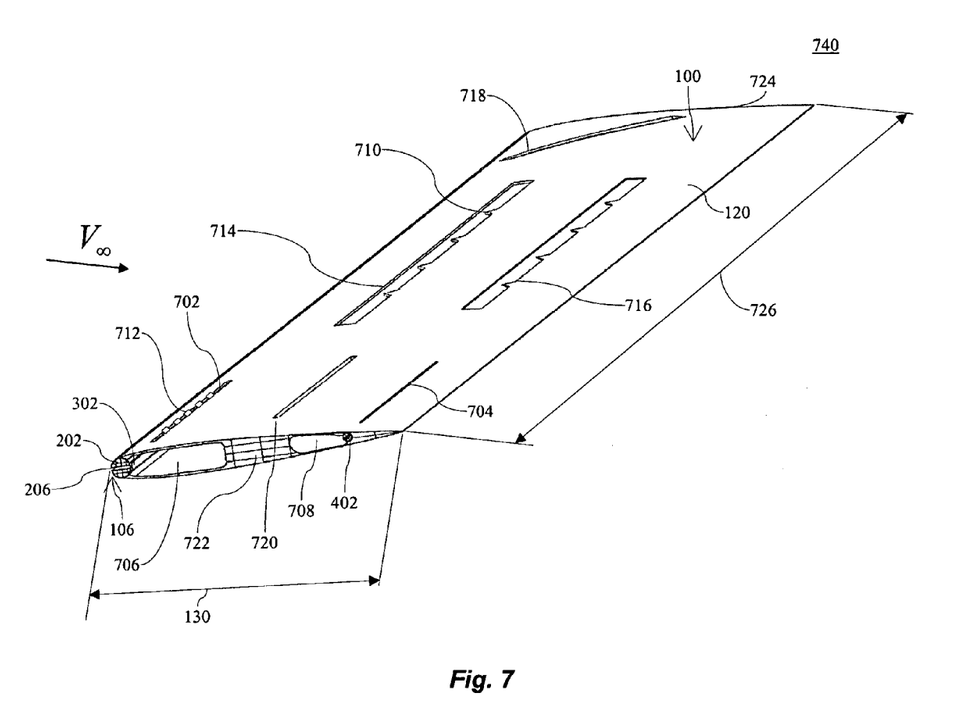
FIG. 7 is a perspective view of yet another airfoil embodiment detailing multiple control mechanism embodiments disposed at multiple locations on the airfoil.

Referring now to the embodiment shown in FIG. 7, a perspective view of the outer portion of an airfoil 100 is shown with notations indicating increasing spanwise position and increasing chord 130 position as well as the relative velocity vector of the free stream flow $V_\infty$. The embodiment depicted in FIG. 7 shows an integrated multi-actuator circulation controlled airfoil 740. In this embodiment, there are multiple internal cavities 112, a first internal cavity 706 and a second internal cavity 708. These separate cavities can be held at separate independent pressures (including pressures which are less than the free-stream pressure essentially creating a suction or vacuum source) and communicate with separate and distinct slots in the surface of the airfoil thereby significantly changing the net fluid flux between either of the internal cavities 706 and 708 and the flow around the airfoil 100. In an alternative embodiment, a passive or active means is placed between the first internal cavity 706 and the second internal cavity 708 to pump fluid between the cavities 706, 708 or maintain a desired relative pressure differential between the cavities 706, 708. Although the specific embodiment shown has a first internal cavity 706 and a second internal cavity 708, multiple internal cavities 112 may be spaced along either or both the spanwise and chordwise 130 length of the airfoil 100. In yet another embodiment, specific flow structures are placed inside the internal cavity 112 to regulate internal flow and pressure inside a specific cavity.

In the embodiment of the integrated multi-actuator circulation controlled airfoil 740 shown in FIG. 7, there is a leading edge rotating assembly 202 with a channel 206 and a sealing mechanism 302. The sealing mechanism 302 regulates the flow of fluid, e.g., air, through the channel 206 between the free stream air and the first internal cavity 706.

In addition to the leading edge rotating assembly 202, the embodiment of the integrated multi-actuator circulation controlled airfoil 740 has multiple slots across both the top surface 120 of the airfoil 100 (shown) and the bottom surface 122 (not shown). Near the root 722 of the airfoil 100, there is a leading upper slot 702, a trailing upper slot 704 and a mid chord upper slot 720. Further, along the span of the airfoil 100 there is another leading upper slot 714 and another trailing upper slot 716. All of the slots 702, 704, 720, 714, and 716 in this embodiment maintain a constant chord 130 position along the spanwise length of the slot. Although the embodiment depicted shows all of the slots 702, 704, 720, 714, and 716 along a constant chord 130 position, other embodiments place the individual slots at alternative locations based on the local aerodynamic conditions manifest at that those locations on the aerostructure in use.

In this embodiment, near the tip 724 of the airfoil 100 is another slot, a tip slot 718. The tip slot 718 is orientated on the surface of the airfoil 100 such that the chord 130 position varies continuously with the spanwise position. Specifically, in the depicted embodiment, the chord position of the tip slot 718 increases substantially with increasing spanwise location. In yet another embodiment, the tip slot 718 is oriented so it is substantially aligned with the tip 724 of the airfoil 100.

It must be noted that the total number of slots in the airfoil 100 may vary significantly based on a number of factors including the desired control capabilities, number of actuators, location of actuators, size of the actuators, and specific flow conditions that are to be encountered by the airfoil 100 during operation in a particular fluid environment and operational scenarios. For example, when using an airfoil 100 to create a hingeless rotor blade for a helicopter the number of actuators may increase while the slot size decreases moving from the root toward the tip 724 of the airfoil 740. The increasing number of actuators provides finer control of the lift generated by the rotor blade near the outer end of the rotor blade. Also, the overall size of the actuator slot needs to be decreased in order to overcome the higher dynamic pressures generated by the freestream flow due to the increased velocity of the rotor blade near the tips compared to near the root. Finally, in high performance rotor blades, it is common for the tips of the rotor blades to experience compressibility effects which require greater internal cavity pressure in order to achieve sufficient flow to modulate the aerodynamic coefficients of the rotor blade.

The integrated multi-actuator circulation controlled airfoil 740 also incorporates other features for controlling its aerodynamic characteristics. Each of the slots has slot control mechanisms for controlling the net flux of fluid between the flow field around the airfoil 100 and either the first internal cavity 706, or second internal cavity 708. For simplicity, the control mechanisms are only shown on the rotating assembly 202, the leading upper slot 702, and trailing upper slot 704. The leading upper slot 702 has a slot control mechanism 712 that provides a means to reduce or increase within limits the flux of fluid into or out of the slot 702. The slot control mechanism 712 in some embodiments also provides the ability to vary the relative constriction of the slot over the spanwise length of the slot making it possible to adjust the flux into or out of the first internal cavity 706 through the leading upper slot 702 to the flow field surrounding the airfoil 100. There are many different potential methods for creating the desired slot control mechanism 712. In one embodiment, piezoelectric actuators similar to the slot control mechanism 712 described in U.S. Pat. No. 6,425,553, which is incorporated herein by reference, is used. In alternative embodiments, other mechanisms for controlling the flow through the upper leading edge slot 702 include the use of small flaps, louvers, and sliding windows. Each of these exemplary flow regulation mechanisms is controlled using a variety of techniques including smart materials, small motors, hydraulics, and other techniques known to those of ordinary skill in the art.

In the case of the trailing upper slot 704, an alternative rotating assembly 402 is used to control the flow of fluid between the second internal cavity 708 and the flow field surrounding the airfoil 100. The rotation of the alternative rotating assembly 402 relative to the sealing mechanism 416 selectively allows flow through the trailing upper slot 704. Also, the rotation of the rotating assembly 402 opens the trailing upper slot 704 when it is in either an anti-flow or flow-wise orientation thereby modulating both the net flow through the trailing upper slot 704 as well as the vector orientation of the flow into or out of the trailing upper slot 704.

In the case of rotary slot control mechanisms such as the rotating assembly 202 and the alternative rotating assembly 402 the rotary devices are controlled individually. The rotating assembly 202 and the alternative rotating assembly 402 are separately controlled by motors located near either end of the airfoil 100 or throughout the span for differential control. The motors provide the rotary motion necessary to actuate or rotate the rotating assembly 202 and the alternative rotating assembly 402 thereby modulating the amount of flow and the vector orientation of the flow emerging from the leading edge slot 106 and the trailing upper slot 704. Examples of some alternative means for creating the rotary urge include piezoelectric and other smart material actuators, and electromagnetic actuators.

In an alternative embodiment, the rotary slot control mechanisms such as the rotating assembly 202 and the alternative rotating assembly 402 are integrated together to enable joint control of multiple actuators at the same time. In one alternative embodiment, all of the rotary devices are integrated into a single geared rotary device input that provides a common urge to multiple rotary slot control mechanisms across the entire airfoil 100. In yet another alternative embodiment, a single rotary device spans and integrates multiple slots across the airfoil 100. For example, a single rotary device spans the rotating assembly 202, and other rotary actuators loaded in the another leading upper slot 714 and the tip slot 718. The single rotary device couples the multiple rotary actuators using flexible couplings or gears that enable the rotary device to actuate all of the rotary actuators in the integrated slots at the same time. In yet another alternative embodiment, slots oriented along a common chord position such as the upper leading edge slot 702 and the another upper leading edge slot 714 share a common axis of rotation and the rotary device can be formed as a single monolithic unit.

Mixing different types of fluid flux from multiple slot locations provide complimentary aerodynamic control effects. For example in one embodiment, the trailing edge slots, such as the trailing upper slot 704, the another trailing upper slot 716 inject fluid into the flow field surrounding the airfoil 100, substantially tangential to the surface of the airfoil 100. The tangential injection of fluid encourages a Coanda effect, whereby the injected air flowing substantially tangentially along the surface of the airfoil 100 effectively 'pulls' the free stream air back down on the airfoil 100 to increase lift and delay flow separation phenomena. In an alternative embodiment, the trailing upper slot 704 and another trailing upper slot 716 inject air into the flow field surrounding the airfoil 100 substantially perpendicular to, or at an angle into the freestream velocity vector.

The relative fluid flux injection angles into the flow field surrounding the airfoil 100 are variable at each given slot location to maximize desired aerodynamic control effects. For example in one embodiment, the leading upper slot 702, and another leading upper slot 714 maybe substantially oriented so the flux is directed into the free stream velocity vector. While the trailing upper slot 704 and another trailing upper slot 716 are injected tangentially into the flow field surrounding the airfoil 100. Together the effects of the leading and trailing slots 702, 714, 704, and 716 serve to compliment each other to increase the lift of the airfoil 100 in a given aerodynamic condition.

Another feature shown in the embodiment in FIG. 7 are the slot structures 710, located inside the other leading upper slot 714 and other trailing upper slot 716. The slot flow structures 710 are only shown on the two slots 714 and 716 for convenience to reduce the complexity of the drawing. The slot structures 710 create desired flow patterns in the fluid flux emerging from the slots 714 and 716 to adjust the influence of the fluid injection into the flow field surrounding the airfoil 100. In this embodiment, the slot structures 710 are in the shape of triangular structures placed in the plane of the slot itself. The triangular slot structures 710 in this embodiment do not cover the slot opening from base to tip, however, in alternative embodiments the slot structures 710 extend from one edge of the slot 714 to the opposite edge.

The slot structures 710 create specific flow patterns in the fluid injected into the flow field surrounding the airfoil 100. The use of different profile slot structures 710 in the mouth of the slot can produce different flow structures in fluid being ejected from the slot and these flow structures then interact with the flow field surrounding the airfoil 100 to modify its effective aerodynamic characteristics. Some of the different flow structures 710 that are available to those skilled in the art include triangular, rectangular, trapezoidal, circular, cylindrical oriented so the length of the cylinder is both perpendicular to the and into the slot, and other multi-faceted shapes. The thickness of the slot flow structures 710 may be either substantially flat or planar with only sufficient depth to maintain structural integrity or may alternatively protrude deeper into the slot for additional strength and to further manipulate the flow through the slot.

Control Systems for Circulation Controlled Airfoils

Figure 8:
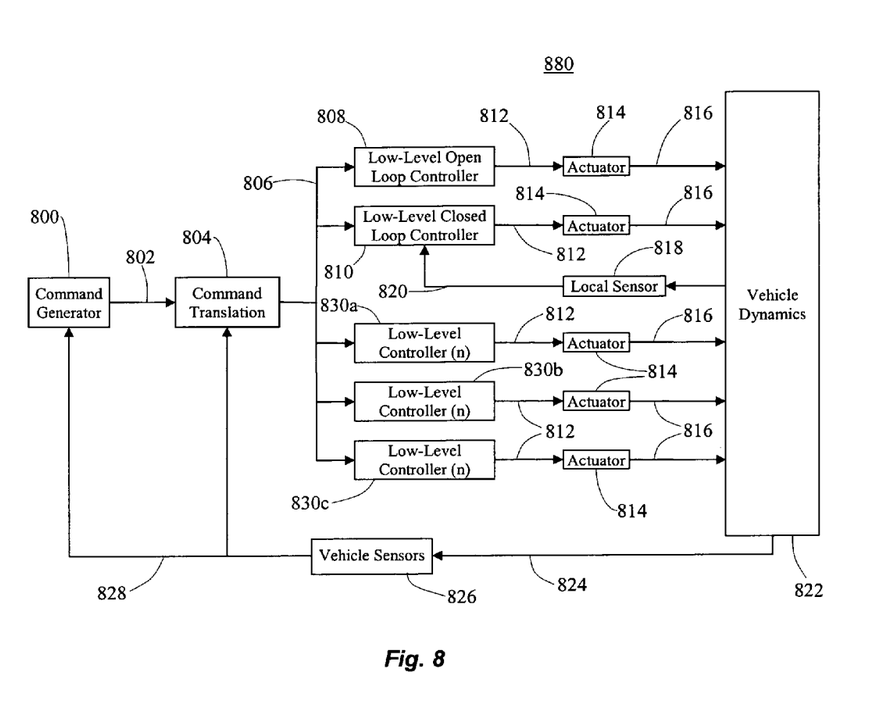
FIG. 8 is a diagram of one embodiment of a control system to command the embodiments of the circulation controlled airfoil.

FIG. 8 depicts one embodiment of a control system 880 to command a circulation controlled airfoil. The control system 880 is generalized to be applicable to most vehicle control systems, regardless of type including but not limited to, airborne, automotive, aquatic or otherwise. First, there is a desired command generator 800. The command generator 800 is a pilot or operator providing an input to a control device such as a stick or stick and collective on a helicopter. A vehicle operator or pilot serving as the command generator 800 visualizes the environment around the vehicle (an exogenous input), couples the observation with vehicle state 828 information provided by flight instruments, and then determines a course of action. Based on this course of action, the pilot then manipulates the vehicle controls such as a stick, rudder, wheel, collective, or throttle in order to generate command input(s) 802.

In alternative embodiments, the command generator 800 is an automated, or semi-automated electronic, mechanical, computerized, or hybrid system. For example, in one embodiment, the command generator 800 is a traditional autopilot system whereby the commands generated are simply desired parameters as in the case of an aircraft, rate of climb, altitude preset, airspeed, and turning. For systems with waypoint or trajectory navigation systems, the computer plots a desired course for the vehicle and then issues command inputs 802 based on the estimated error between the desired vehicle geospatial location and trajectory versus the actual vehicle location and trajectory. In yet another alternative embodiment, the command generator 800 has a direct relationship, such as a step function or curvilinear function, that changes the command input 802 based on a change in a parameter. For example, in the case of automotive applications, the command generator 800 generates a command input 802 to increase lift generated by an airfoil 100 mounted on the vehicle versus an increase in velocity in order to enhance traction.

Regardless of the specific embodiment of command generator 800 used, the command generator 800 provides a desired command input 802 for the control system 880. The command input 802 is input to the command translation system 804. The command translation system 804 transfers, interprets, and mixes, if necessary, the command input 802 into an actuator command 806. The command translation system 804 is either a computer controlled electronic, discrete or analogue electronic, electro-mechanical, electro-hydraulic, mechanical, or hydraulic system. In one embodiment, the command translation system 804 is a straight through connection that passes a command input 802 through to actuator commands 806 directly with substantially no change. An example of a system like this is a rod or mechanical linkage between the command generator 800 and the low-level controllers 808, 810 and 830.

Another embodiment of the command translation system 804 applies a mathematical relationship between a command input 802 and the actuator command 806. One non-exhaustive example of this kind of relationship in the command translation 804 would be a hydraulic or mechanical amplifier that would amplify or attenuate a command input 802 into an actuator command 806.

Yet another embodiment of the command translation system 804 mixes, combines, and amplifies command input 802 from the command generator 800 to create a synthetic actuator command 806. The command translation system 804 may use a number of different techniques to mix, combine, and amplify command inputs 802, including, for example, algorithms defined a priori, adaptive or static, linear or non-linear models of actuator performance, gain scheduling, neural networks, fuzzy logic, of stochastic control algorithms. For some embodiments, the command translation 804 utilizes vehicle state 828 information estimated by the vehicle sensors 826 to modulate or otherwise change actuator command 806. Similarly, the command translation system 804 in a similar embodiment may comprise an autopilot controller, vehicle control system, or dynamic stability augmentation system.

In the case of a helicopter, for example, the command translation system 804 may be manifest in a number of physical embodiments. In an embodiment common for a small helicopters, a direct mechanical linkage, including rods or cabling, or hydro-mechanical linkages directly coupled between the helicopter pilot's controls, the stick, collective, and potentially throttle (together the command generator 800), to create the actuator command 806. The command translation system 804 translates the command inputs 802 into the actuator commands 806 necessary to manipulate the swash plate collectively up and down to control overall lift or obliquely about the axis of rotation in order to control the orientation and lift generated by the blade according to location.

In an alternative embodiment of a helicopter control system 880, the command translation system 804 comprises a computer system with processing capability, a program, and potentially memory means, that create actuator commands 806 directed to individual aerostructures on the surface of the helicopter by translating the command input 802. For example, the actuator command 806 output by the command translation 806 may take the form of a desired lift to be generated by a specific rotor blade based on rotational position of the blade, if the lift capabilities of specific actuators are substantially known. Alternatively, the actuator command 806 is a desired change in the lift generated by the airfoil 100. In the case of a system with multiple actuators, such as the physical embodiment shown in FIG. 7, the command generator provides a series of different actuator commands 806 for each different actuator such as the leading upper slot 702 and trailing upper slot 704 and mid chord upper slot 720.

A series of low-level controllers (a, b, c) 830*a*, 830*b*, and 830*c*, collectively referred to as 830, directly controls each individual actuator 814. The low-level controllers 830 can be either/or a combination of a low-level closed-loop controller 810 and a low-level open-loop controller 808. The low-level controllers 830 take the actuator command 806 from the command translation system 804 to generate actuator inputs 812. The actuator inputs 812 as applied to the actuator 814 produce a control action 816 that is applied to the vehicle dynamics 822 in order to illicit a change in vehicle performance.

The open-loop controller 808 is in its most straightforward form, an open-loop unity gain. As an open-loop unity gain, the open-loop controller 808 forms a direct pass through of the actuator command 806 to the actuator input 812. In an alternative embodiment, the low-level controller 808 modulates the actuator command 806 to amplify or attenuate the actuator input 812 based on the needs of a specific actuator 814. In other embodiments, the low-level controller 808 translates the actuator command 806 from a digital or generalized analog signal into an actuator input 812, such as a series of pulses necessary to command a servo motor actuator 814. The open-loop controller 808 does not rely on specific feedback from the local performance of the actuator 814 in order to determine the appropriate actuator input 812 to apply to the actuator 814 in response to a directed actuator command 806. However, the response of the open loop controller may be tailored or scheduled based on additional information sent along with actuator commands 806, as a gain scheduling controller operates to amplify or attenuate the actuator input 812. In the case of distributed actuators, the actuator commands 806 may be modulated or changed by linking gain scheduling parameters between multiple low-level open loop 808 and other low-level controllers 830.

The linkage of multiple low-level controllers 830 with actuators is highlighted by referring to the embodiment of the circulation controlled airfoil shown in FIG. 7 and the control system 880. The baseline low-level controllers 830, including the exemplary open-loop controller 808 and closed-loop controller 810, provide actuator inputs 812 to the actuators 814. The individual actuators 814 shown in block diagram form correspond to the slot control mechanism 712. Further, the individual actuators 814 can include motors and other actuators or structures as described above for rotating the rotating assembly 202. Additionally, the individual actuators 814 can include traditional flight control surfaces, such as leading edge slats, ailerons, flaps, flaperons, and other traditional aerodynamic control surfaces known to those of ordinary skill in the art. In an alternative embodiment a single low-level controller 830 provides actuator inputs 812 to multiple actuators 814.

The linkage of multiple low-level controllers 830 with multiple actuators 814 enables mixing of control signals during operation. For example, a single low-level controller 830 is associated with each of the leading upper slot 702, the mid-chord upper slot 720, and the trailing upper slot 704. Initially low-level controllers 830 command the slots to operate such that the leading upper slot 702 is only partially open, while the mid-chord upper slot 720 and the trailing upper slot 704 are both closed. Then as the actuator command 806 requests additional lift from the airfoil 100, the low-level controller 830 associated with the leading upper slot 702 will open the control fully. As the low-level controller 830 saturates its actuator input 812 to the leading upper slot 702, the low-level controller 830 associated with the mid-chord upper slot 720 opens the mid-chord upper slot 720 to continue generating additional lift. Similarly, as the mid-chord upper slot 720 becomes saturated, the low-level controller 830 associated with the trailing upper slot 704 provides actuator inputs 812 to open the trailing upper slot 704 and generate additional lift. Each of the low-level controllers 830 uses the actuator commands 812 provided to each actuator 814 by other associated low-level controllers 830, along with the actuator command 806 to determine the actuator input 812 delivered to the actuator 814. In such a manner, the low-level controllers 830 provide knowledge of current actuator performance and mix the actuator inputs 812 provided to the distributed actuators on the airfoil in order to create the desired aerodynamic characteristics for the airfoil 100.

In an alternative embodiment, the performance of each low-level controller 830 and the actuator input 812 is provided to other associated low-level controllers 830 via a communication bus that also provides the actuator command 806. The actuator command 806 in an alternative embodiment may perform actuator mixing as part of the command translation system 804 and thus address individual low-level controllers 830 as individual actuators, or smaller groups of actuators, rather then as one group. In yet another embodiment, the actuator command 806 provides parameters to selectively attenuate or amplify specific low-level controllers 830 in order to achieve specific performance results.

Each low-level controller 830, regardless of open or closed loop operation, generates a command signal 812 that is applied to the actuator 814 in response to the actuator command 806. The command signal 812 commands the actuator 814 to operate in a specific manner. Each actuator 814 is directly or indirectly coupled 816 to the vehicle dynamics 822. For example, in the case of a piezoelectric actuator system such as that used in the slot control mechanism 712, the commands 812 are electrical signals which are modulated or calibrated to drive the piezoelectric actuators 814 in order to modulate the opening and closing of the leading upper slot 702. In the case of a servo or electrohydraulic motor the commands 812 may be electrical power to energize the motor or open a hydraulic valve. For a purely mechanical system, the controls 812 may be a rotating rod with cams attached or a push rod.

An open-loop controller 808 effectively operates as a gain or other relationship to the actuator command 806 provided to the controller. The open-loop controller 808 gain is modulated by the operation of the associated low-level controllers 830. In an alternative embodiment, the open-loop controller 808 gain is not modulated by operation of associated low-level controllers 830.

The closed-loop controller 810 provides an actuator input 812 based on the actuator command 806 coupled with feedback from either local or global effects generated by the actuator 814 or by feedback from of the individual actuator 814 state. The vehicle dynamics 822 represents the combined effect of all of the physical actuators on the aerodynamic, Newtonian, and other forces generated by and applied to the vehicle, aerostructure, or isolated airfoil 100. The operation of a specific actuator 814 has both a local effect and a global effect on the vehicle dynamics 822. A local effect is manifest in a number of ways, including a change in local pressure or sheer stress on a specific region of the aerostructure potentially in or near the actuator. A global effect is manifest by larger changes such as a change in the overall lift generated by an airfoil 100 or the physical translation and rotation of the body in space. For the closed-loop controller 810, the local effect is sensed by a sensor 818. In alternative embodiments, the closed-loop controller 810 uses the global effect or a combination of both local and global effects. The sensor 818 estimates the current manifestation of the local effect on the vehicle dynamics 822 to generate sensed data 820 information. The sensed data 820 is then fed back into the closed-loop controller 810. The sensed data 820 is used along with the actuator command 806 to adjust the actuator input 812 fed to the actuator 814 in order to generate the desired control.

The vehicle dynamics 822 manifest themselves as changes to the vehicle 824. The changes to the vehicle 824 are measured by vehicle sensors 826. The vehicle sensors 826 in turn estimate the vehicle state 828. In the case of a human pilot, the vehicle sensors 826 are various vehicle enunciators as well as their own physical sensors. In the case of a fly-by-wire control system, the vehicle sensors 826 are solid state, mechanical, and pneumatic sensors.

The communications between the various elements of the system such as the command input 802, the actuator commands 806, and the vehicle state 828 as well as other commands are handled through a number of different means including, mechanical, electro-mechanical, electronic, or light. In one embodiment, the communications may be a MIL-STD 1553 (Military Standard) electronic digital communication bus. In yet another embodiment, the communications use light on a MIL-STD 1773 optical digital communication bus or FDDI (Fiber Distributed Data Interface) enabling the flow of data between the various elements of the control system. In still another embodiment, the commands are transmitted by means of a mechanical wires and push-rods.

CONCLUSION

The numerous embodiments described above are applicable to a number of different applications. One particular application where the aerodynamic control system is particularly applicable is in rotorcraft, such as helicopters ranging from small radio controlled helicopters through unmanned remotely piloted and autonomous helicopters, to large passenger and cargo helicopters for both civilian and military purposes. The technology for adapting flow over airfoils and other aerostructures is also applicable to short/vertical take-off and landing hybrid aircraft such as the V-22 Osprey and the civilian Bell 609 or more traditional STOVL such as the F-35. The technology can also be used to simplify or improve the performance of control surfaces on more traditional aircraft and transports such as the Cessna Caravans, or C-17 Globemaster IIIs. In additional to aircraft use, the technology described is generally applicable to any variety of aerostructures in a variety of different media. Different applications of aerostructures include ships and submarines, and the manipulation the flow of water, air, or other fluids in industrial settings. Finally, application to trucks, automobiles and race cars to reduce drag, generate additional traction forces, and improve performance are apparent to one of ordinary skill in the art.

The embodiments of the invention shown in the drawing and described above are exemplary of numerous embodiments that may be made within the scope of the appended claims. It is contemplated that numerous other configurations of a circulation controlled airfoil may be created taking advantage of the disclosed approach. It is the applicant's intention that the scope of the patent issuing herefrom will be limited only by the scope of the appended claims.

What is claimed is:

1. A system for modulating the aerodynamic characteristics of an airfoil with an external surface, comprising:

An internal cavity located within the external surface;

A slot located on the external surface, connecting said internal cavity to the external surface;

A rotating assembly inserted into and rotating within said slot with a first orientation and a second orientation; and A channel formed through said rotating assembly with an internal opening to said internal cavity and an external opening to the external surface, wherein said channel allows flow between said internal cavity and the external surface in said first orientation, and said channel substantially prevents flow between said internal cavity and the external surface in said second orientation.

2. A system of claim 1, further comprising a sealing mechanism located within said internal cavity that occludes said channel in part of said first orientation.

3. A system of claim 2, wherein the occlusion of said channel by sealing mechanism creates a third orientation and a fourth orientation, whereby said sealing mechanism blocks said channel in said third orientation preventing flow through said channel between said internal cavity and the external surface of the airfoil, while said channel is not blocked by said sealing mechanism in said fourth orientation thereby allowing flow through said channel between said internal cavity and said external surface of the airfoil.

4. A system of claim 2, whereby a wedge located within said rotating assembly divides said internal opening into two separate inlets.

5. A system of claim 1, wherein said internal cavity is pressurized such that flow through the channel is directed from said internal cavity out to said external surface.

6. A system of claim 1, wherein said slot is located in the leading edge of the airfoil.

7. A system of claim 6, wherein the rotation of said rotating assembly can orient said external opening from −60 degrees to +60 degrees from the centerline of said airfoil.

8. A system of claim 6, further comprising:

A second slot located on the surface of the airfoil connecting said internal cavity to the external surface;

A second rotating assembly inserted into and rotating within said second slot with an A orientation and a B orientation; and, A second channel formed through said second rotating assembly with an inner opening to said internal cavity and an outer opening to said external surface, wherein said second channel allows flow between said internal cavity and the external surface in said A orientation, and said second channel substantially prevents flow between said internal cavity and the external surface in said B orientation.

9. A system of claim 8, wherein said second rotating assembly is located in the trailing edge of the airfoil.

10. A system of claim 8, wherein said second channel connects a second internal cavity located within the external surface to said external surface.

11. A system of claim 6, further comprising slots located on the upper and lower surfaces of the airfoil, wherein each slot has an open position that allows flow through between said internal cavity and the external surface and a closed position that substantially prevents flow through said internal cavity and the external surface.

12. A system of claim 11, wherein a pair of said slots are located within the first 50% chord of the airfoil.

13. A system of claim 12, wherein said internal cavity is pressurized and said slots are oriented to direct the flow from the internal cavity to the external surface into the relative velocity vector of the freestream air over the external surface.

14. A system of claim 11, wherein said slots are modulated such that flow between said internal cavity and the external surface varies between a minimum in said closed position and a maximum in said open position based on said modulation.

15. A system of claim 11, wherein said slots allows flow between a second internal cavity within the external surface to said external surface.

16. A system of claim 1, further comprising a control means for directing the rotation of said rotating assembly to modulate the aerodynamic characteristics.

17. A helicopter rotor blade control system, comprising:

A rotor rotatably mounted to the helicopter;

A rotor blade with an exterior, an interior, a leading edge, a trailing edge, and root attached by said root to said rotor;

An internal cavity formed in said interior and connected to said rotor such that air can flow between said rotor and said internal cavity;

A slot formed in said leading edge creating a channel between said internal cavity through to said exterior; and, A rotary actuator with a first orientation and a second orientation located inside said channel whereby said rotary actuator in said first orientation forms a channel allowing air to flow between said exterior and said internal cavity and when said rotary actuator in said second orientation closes the channel to substantially prevents air from flowing between said exterior and said internal cavity.

18. A system of claim 17, whereby said internal cavity is pressurized with air.

19. A system of claim 17, whereby in said second orientation, said rotary actuator forms a second channel allowing air to flow between said exterior and said internal cavity and said rotary actuator closes said second channel in said first orientation, such that said second channel substantially prevents air from flowing between said exterior and said internal cavity.

20. A system of claim 17, whereby said root is rigidly attached to said rotor.

21. A system of claim 17, whereby said rotary actuator decreases the lift generated by said rotor blade when said rotor blade is in one portion of its rotation around the helicopter and increases lift in the remaining portion of its rotation around the helicopter.

22. A system of claim 17, further comprising slots located on the upper and lower surfaces of the airfoil, wherein each slot has an open position that allows flow through between said internal cavity and the external surface and a closed position that substantially prevents flow through said internal cavity and the external surface.

* * * * *